(12) United States Patent
Van Zanten

(10) Patent No.: US 7,360,336 B2
(45) Date of Patent: Apr. 22, 2008

(54) PLANT BASE

(75) Inventor: Evert Van Zanten, Maasdijk (NL)

(73) Assignee: E. Van Zanten Holding B.V., Naaldwijk (NL)

( * ) Notice: Subject to any disclaimer, the term of this patent is extended or adjusted under 35 U.S.C. 154(b) by 16 days.

(21) Appl. No.: 10/869,316

(22) Filed: Jun. 16, 2004

(65) Prior Publication Data
US 2005/0160668 A1    Jul. 28, 2005

(30) Foreign Application Priority Data
Jun. 17, 2003    (NL) .................................... 1023678

(51) Int. Cl.
*A01G 7/02* (2006.01)
*A01G 9/04* (2006.01)
*A47G 7/00* (2006.01)

(52) U.S. Cl. ................ 47/39; 47/65; 47/71; 211/85.23; 211/88.03; 211/49.1; 248/311.2; 248/314; 248/27.8; 248/346.01; 248/348.03; 248/346.5; 248/223.4; 220/23.4; 108/64; 401/381; 401/339; 401/340

(58) Field of Classification Search ............. 47/39, 47/65, 41.01, 71, 18, 19.1, 25.1, 63, 65.5, 47/66.1, 66.3, 66.4, 66.6, 66.7; 220/23.4; 211/85.23, 88.03, 49.1; 248/311.2, 314, 248/27.8, 346.01, 346.03, 346.5, 223.4; 108/158.12, 64, 185, 65; 446/476, 85; 52/591.1, 52/591.2; 403/381, 339, 340, 294; *A01G 7/02*
See application file for complete search history.

(56) References Cited

U.S. PATENT DOCUMENTS

| | | | | |
|---|---|---|---|---|
| 138,520 | A * | 5/1873 | Northup | 52/592.1 |
| 554,661 | A * | 2/1896 | Doolittle | 108/105 |
| 1,740,364 | A * | 12/1929 | Dal Maso | 248/231.31 |
| 2,019,249 | A | 10/1935 | Bradley | |
| 2,022,398 | A * | 11/1935 | Beyer | 47/18 |
| 2,063,289 | A * | 12/1936 | Alusas | 47/40 |
| RE23,002 | E * | 5/1948 | Partee et al. | 118/641 |
| 2,740,515 | A * | 4/1956 | Wilson | 198/633 |
| 3,265,338 | A * | 8/1966 | Henderson | 248/27.8 |
| 3,326,504 | A * | 6/1967 | St. Lawrence et al. | 248/27.8 |

(Continued)

FOREIGN PATENT DOCUMENTS

AU    9454938 A *    3/1995

(Continued)

*Primary Examiner*—Andrea M. Valenti
(74) *Attorney, Agent, or Firm*—The Webb Law Firm

(57) ABSTRACT

The invention provides a plant base comprising a base section with a seat for a plant pot, in which a tail section extends in a horizontal direction from the rear of the base section. A groove/protuberance combination is provided at the front of the base section and the rear of the tail section that is able to be accommodated in the groove of another corresponding plant base. The groove and the protuberance each has a support surface that is lower or higher than the support surface of the groove, such that when the protuberance of the plant base has been taken up in the groove of the other plant base, one of the two plant bases is lifted from the substrate at the location of the engaging protuberance and groove. Thus, the invention provides a plant base that continuously retains the same orientation during transport over a conveyor belt, with successive plant bases kept a sufficient distance apart.

10 Claims, 2 Drawing Sheets

U.S. PATENT DOCUMENTS

| | | | |
|---|---|---|---|
| D229,708 S * | 12/1973 | Chapman | D11/143 |
| 4,248,014 A | 2/1981 | Williames | |
| 4,379,375 A * | 4/1983 | Eisenberg et al. | 47/65 |
| 4,969,290 A | 11/1990 | Skoretz | |
| 5,457,911 A * | 10/1995 | Vollink | 47/67 |
| 5,687,505 A * | 11/1997 | Haufler et al. | 47/72 |
| 5,941,019 A * | 8/1999 | Guarriello et al. | 47/66.6 |
| 6,010,104 A * | 1/2000 | Hanson et al. | 248/311.2 |
| 6,385,936 B1 * | 5/2002 | Schneider | 52/589.1 |
| 6,804,926 B1 * | 10/2004 | Eisermann | 52/592.1 |
| 7,121,058 B2 * | 10/2006 | Palsson et al. | 52/592.2 |
| 2003/0070357 A1 * | 4/2003 | Huang | 47/66.3 |

FOREIGN PATENT DOCUMENTS

| | | | |
|---|---|---|---|
| EP | 0018329 A1 * | 10/1980 | |
| EP | 0 688 012 A1 | 8/1995 | |
| EP | 1488687 A1 * | 6/2004 | |
| EP | 1488688 A1 * | 6/2004 | |
| FR | 2 519 246 A | 7/1983 | |
| JP | 03070675 A * | 3/1991 | |
| JP | 09103350 A * | 4/1997 | |
| JP | 2002247920 A * | 9/2002 | |
| NL | 8502285 A | 3/1987 | |

* cited by examiner

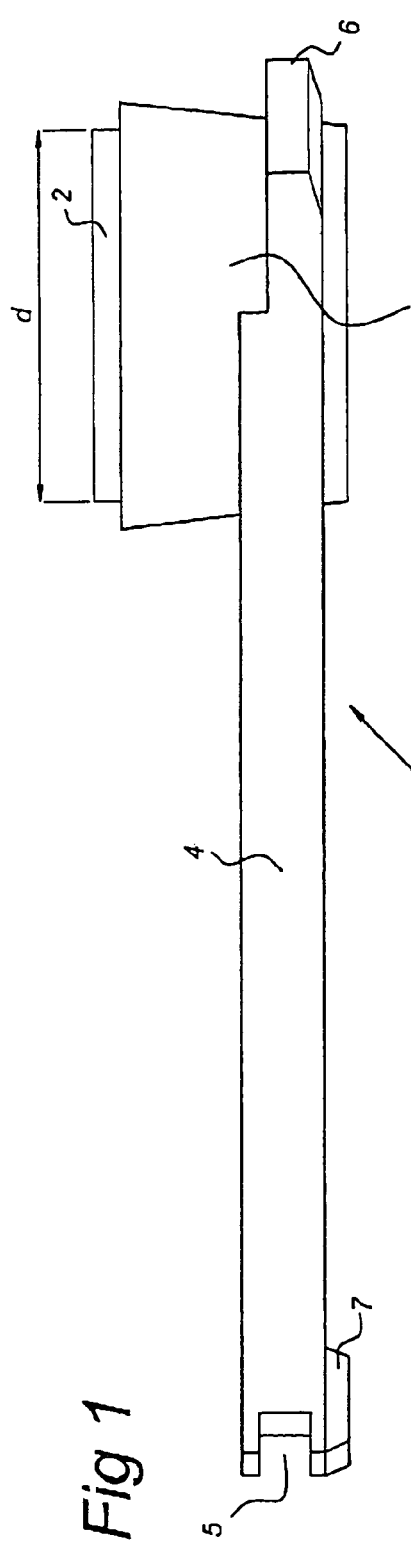
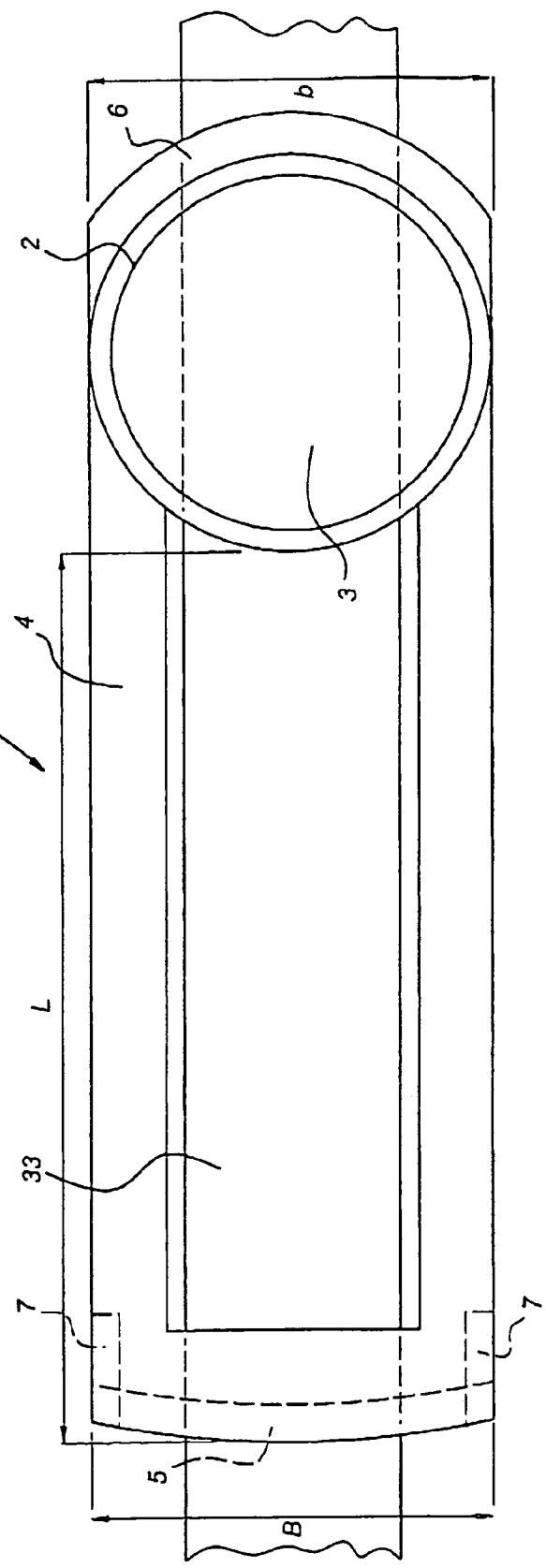

PLANT BASE

BACKGROUND OF THE INVENTION

The present invention relates to a plant base comprising a base section with a seat for a plant pot, the plant base furthermore comprising a tail section that extends in the horizontal direction from a rear of the base section.

The field of application will be, in particular, in horticulture, also including multiplication, plant breeding, cultivation, trade in such products, etc. More specifically, the plant base will be used in those activities in horticulture where a conveyor system is used.

SUMMARY OF THE INVENTION

One of the aims of the plant base mentioned in the preamble is that the plant base continuously retains the same orientation during transport. This is achieved in that the base section or tail section collides with the side walls of the conveyor system during transport, during which collision the base section and the tail section joined thereto will rotate just until the tail section becomes essentially parallel to the side wall and thus also parallel to the direction of transport, where the tail section will extend from the base section in a direction opposed to the direction of transport. If the plant base is moved from the one conveyor belt to another conveyor belt, which, for example, is provided perpendicularly thereto, this process will be repeated until the orientation of the plant base has been adapted to the new direction of transport. During this operation use can optionally be made of a special guide member, such as a guide strip, that is provided at a certain angle with respect to the conveyor belt and prevents too substantial sudden rotations of the plant base.

The tail section thus ensures that the plant base continuously assumes the same orientation with respect to the direction of transport. This direction-seeking aspect is advantageous in the case of treatment operations on a plant, or a flower, where only one side of the plant or the flower has to be treated. Furthermore, consideration can be given to stronger illumination of one side of a plant or a crop, where there are the most fruits or flowers.

A second aim of the invention is that successive plant bases are kept a certain distance apart. Together with the direction-seeking function of the tail section, as described in the previous paragraph, during transport of a series of plant bases positioned next to one another, the tail section of a plant base at the rear thereof will be in contact with the base section of a following plant base. As a result, two plant bases located next to one another will continuously be held apart by a distance that is at least equal to the length of the tail section.

One advantage here is that plants located next to one another are no longer able to become entangled with one another and thus are no longer able to damage one another. This is important in particular in the case of plants that spread beyond the diameter of the associated plant pot.

A third advantage of the plant base mentioned in the preamble is that the tail section provides additional stabilisation for the plant base to prevent the plant pot associated with the plant base from falling over. In particular, this is the case if the tail section is provided just above or even in contact with the conveyor bell. This will be of importance especially in the case of relatively tall crops or plants, or at least crops or plants with a high centre of gravity, when, for example, treatments are carried out on the upper part thereof.

DETAILED DESCRIPTION OF THE PREFERRED EMBODIMENTS

In an advantageous embodiment of the plant base according to the invention, a groove/protuberance combination is provided at the front of the base section and the rear of the tail section, the protuberance on the plant base being able to be accommodated in the groove of a further corresponding plant base, the groove and the protuberance each having a support surface, the support surface of the protuberance being lower or higher than the support surface of the groove, such that when the protuberance of the plant base has been taken up in the groove of the corresponding further plant base one of the two plant bases is lifted from the substrate at the location of the engaging protuberance and groove.

The advantage of this embodiment is, in particular, important in the case where a row of plant bases is stationary on a conveyor belt moving underneath the plant bases and is supplemented by new plant bases via the conveyor belt, by holding back the first plant base in the row, for example against a stop. This situation will arise, for example, when packing plants and making them ready for transport or when manually supplementing a row of plants before these enter further into the conveyor system in their entirety. As a result of lifting one of the two plant bases from the substrate at the location of the engaging protuberance and groove the friction between the (stationary) plant base, on the one hand, and the moving conveyor belt, on the other hand, will be reduced. The advantage of the reduced friction is that the risk of slipping or jamming of the conveyor belt is also reduced. Another advantage is that driving the conveyor belt will cost less energy in such a case.

In another advantageous embodiment of the plant base, the groove or protuberance is provided with a lead-in guide surface on the same side as the support surface of the groove or protuberance, respectively, at the free end of the groove or protuberance, respectively. This embodiment facilitates taking up of the protuberance in the groove when a plant base moving over a conveyor belt collides with a stationary plant base. Undesired movements of or shocks to the plant base are prevented by this means.

In yet a further advantageous embodiment of the plant base according to the invention, the tail section is provided at the rear with supporting feet and the groove/protuberance combination is provided such that the plant base that is to be lifted locally is lifted at the base section. The advantage of the local lifting of the plant base at the base section, which is much heavier than the tail section, is that the effect of the reduced friction between conveyor belt and plant base, as described in the previous paragraph, is much greater. If the supporting feet are positioned so far apart that a conveyor belt can run between them, it is possible to break the entire contact with the conveyor belt when the base section is lifted up and support is provided by the supporting feet. The conveyor belt is then no longer under load and the plant base is stable and stationary.

According to the invention it is advantageous if, viewed in the longitudinal direction, the length of the tail section is greater than the diameter of the seat. Preferably, the length of the tail section is at least twice as large as the diameter of the seat. With such a difference between the length of the tail section and the diameter of the seat it is ensured that successive plant bases are held an adequate distance apart, so that the plants do not become entangled with one another, even in the case of plants of relatively large bulk. Furthermore, the self-aligning aspect is thus reliably ensured.

According to the invention it is furthermore advantageous if, viewed in the direction transverse to the longitudinal direction, the width of the rear end of the tail section is at least 50% of the width of the base section. More preferentially, this width is at least 70%, such as 90% or more, of the width of the base section. The advantage of this construction of the plant base is that the tail section will become parallel to a side wall or a guide member of the conveyor system more rapidly, so that the direction-seeking function of the plant base is improved.

According to the invention it is furthermore advantageous if the bottom of the base section is provided with slits for allowing water to pass through. Such an embodiment offers the facility for providing the plants with water in an ebb and flow system, for example while they are on a conveyor belt. In this context consideration can be given to the cultivation and/or transport of the plants in a conveyor channel that can be provided with water. Such a system has been described, for example, in EP 668.012.

According to the invention it is furthermore advantageous if the plant base is provided with an information carrier, such as a magnetic strip or a barcode strip. Preferably, this information carrier can be read remotely, for example because the information carrier is able to receive and send back electrical signals of a characteristic frequency. The use of information carriers offers the facility for automatically differentiating various varieties of plants from one another or automatically differentiating plants which have undergone a different cultivation process. This is, for example, important when packing the plants and making them ready for transport.

According to a further aspect, the invention relates to a combination of a conveyor belt and a plant base according to the invention, wherein the conveyor belt has a conveyor belt width, wherein the conveyor belt extends along and over a supporting surface, wherein the plant base has supporting feet that, viewed transversely to the tail, have a mutual spacing that is greater than the conveyor belt width.

BRIEF DESCRIPTION OF THE DRAWINGS

The invention will be explained below with reference to the appended figures, in which:

FIG. 1 shows a side view of the plant base in a preferred embodiment;

FIG. 2 shows a plan view of the plant base in a preferred embodiment;

FIGS. 1 and 2 show a plant base in a preferred embodiment according to the invention, where the plant base comprises a base section 3 and a tail section 4, the tail section extending from a rear from the base section 3 in the horizontal direction. Furthermore, a seat 2 for a plant pot, a groove 5 provided at the rear of the tail section 4 and a protuberance 6 provided at the front of the base section 3 can be seen.

Figure 3A:
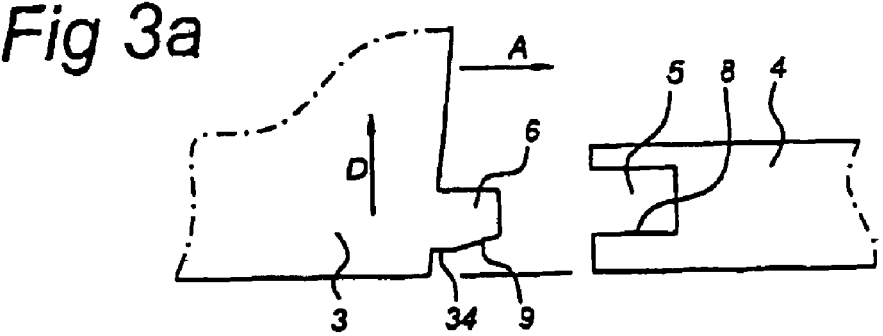
FIG. 3 shows, in a side view and as a detail, four possibilities by means of which the groove/protuberance combination of two successive plant bases can drop into one another.

The seat 2 of the plant base 1 can be of a design known per se, such as a raised rim or a recess in the base section, in which a plant pot can be accommodated. Preferably, the protuberance 6 is provided on the base section 3 and the groove 5 is provided on the tail section 4. However, it is also readily conceivable to provide the groove 5 on the base section 3 and to provide the protuberance 6 on the tail section.

Supporting feet 7 are provided at the rear of the tail section 4. This offers two advantages. The first is that in this way the contact surface with the underlying surface is reduced. Thus, if this underlying surface is a conveyor belt the friction encountered during slipping will be less. The second advantage is that if the width of the conveyor belt is less than the distance between the supporting feet 7, viewed transversely to the tail, and if the plant base is oriented in the conveyor belt direction, the plant base has no contact at all with the conveyor belt when the base section is lifted. Reference is made to EP 668.012 for an example of conveyor belts that can be used.

Furthermore, FIGS. 1 and 2 show a diameter d of the seat 2 provided at the base section 3, a width B and a length L of the tail section 4 and, finally, a width b of the base section 3.

In the preferred embodiment of the plant base the length L of the tail section 4 is a number of times larger than the diameter d of the seat 2. With such a size, successive plant bases provided with plants will be kept a sufficient distance apart. Even in the case of plants that are relatively broad, the risk of plants next to one another becoming entangled is very low.

Furthermore, in a preferred embodiment of the invention the width B of the rear end of the tail section 4 is preferably at least 90% of the width b of the base section 3. In the embodiment as shown in FIGS. 1 and 2, the width b of the base section 3 is even the same as (100% of) the width B of the tail section 4. If such a plant base has to change direction during transport, the relatively broad tail section will more easily become parallel with a side wall or a guide member of the conveyor system and thus assume the correct direction earlier. A broader tail section 4 therefore improves the direction-seeking capacity of the plant base 1.

FIG. 3 shows the groove/protuberance combination in detail and in side view and serves to illustrate four possibilities for accommodating the protuberance in the groove. In FIGS. 3a and 3b the protuberance 6 is provided on the base section 3 and the groove 5 is provided on the tail section 4. In FIGS. 3c and 3d this is the other way round and, therefore, the protuberance 6 is provided on the tail section 4 and the groove 5 is provided on the base section 3. The possibilities according to FIGS. 3a and 3d are preferred according to the invention, especially in combination with the supporting feet at the rear end of the tail section, which are not shown here.

In addition to the known components from FIGS. 1 and 2, support surfaces 8 and 34 and a run-in guide surface 9 can also be seen in FIG. 3. A characteristic feature of the invention is that the support surface 34 of the protuberance is lower or higher than the support surface 8 of the groove. The run-in guide surface 9 is provided on the same side as the support surface 34. In FIG. 3 the run-in guide surface 9 is provided at the free end of the protuberance 6. It is, however, also readily conceivable that the run-in guide surface 9 is provided at the free end of the groove 5. In fact there are thus 8 possibilities by means of which a groove/protuberance combination of two successive plant bases can come together. Furthermore, it is pointed out that the support surface 34 can also be at an angle. For example, it can be the extension of run-in guide 9. The transition between run-in guide 9 and support surface 34 can be invisible with this arrangement. The support surface portion will then start where base section or tail section is just lifted up.

Instead of using a run-in guide surface 9 on the protuberance 6, the run-in guide surface could also be provided in the groove 5 in each case. Instead of sloping run-in guide surfaces, run-in guide surfaces running in a curve could also be provided. It is also possible for both the protuberance and the groove to be provided with a run-in guide surface.

FIG. 3*a* shows the preferred embodiment of the plant base according to the invention, where the support surface 34 of the protuberance 6 provided on the base section 3 is lower than the support surface 8 of the groove 5 provided on the tail section 4. If the plant base on the left in FIG. 3*a* moves in the direction indicated by arrow A, the protuberance 6 will be taken up in the groove 5, the base section 3 being lifted slightly from the substrate in a direction indicated by arrow D.

Figure 3B:
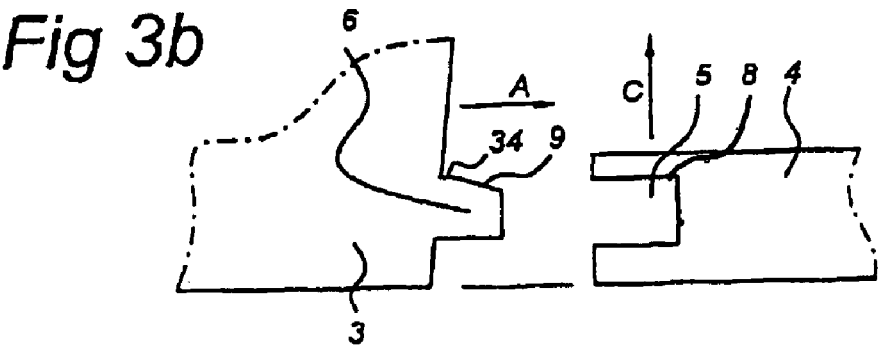

In the embodiment as shown in FIG. 3*b*, the tail section 4 located on the right-hand side in the figure will be lifted from the substrate in a direction indicated by arrow C.

Figure 3C:
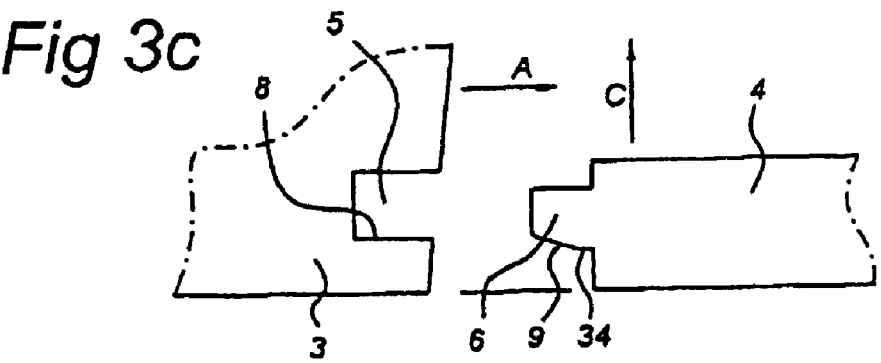
Figure 3D:
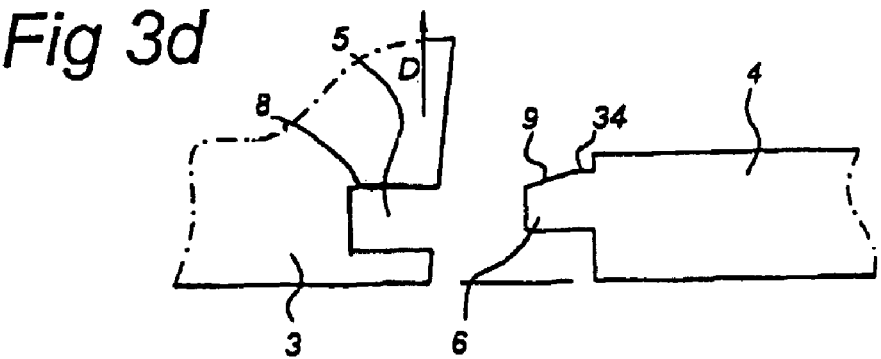

In the embodiments as shown in FIGS. 3*c* and 3*d* the location of the groove and the protuberance, respectively, is reversed and, in a manner corresponding to that explained above, the tail section 4 is lifted from the ground (FIG. 3*c*) in the direction C and the base section 3 is lifted from the ground (FIG. 3*d*) in the direction D, respectively.

Because, during transport, the tail section 4 will extend in the opposite direction with respect to the direction of transport, in practice the base section 3 moving in the direction A will come together with a stationary or more slowly moving tail section 4.

The invention claimed is:

1. A plant base comprising a base section with a seat for a plant pot, wherein the seat comprises a raised rim or a recess in the base section, the raised rim or recess adapted for accommodating the plant pot and wherein the plant base furthermore includes a tail section that extends in the horizontal direction from a rear of the base section, and wherein a groove/protuberance combination also extends substantially in a horizontal direction and is provided respectively at the front of the base section and the rear of the tail section, wherein the protuberance on the plant base is able to be accommodated in the groove of a further corresponding plant base, wherein the groove and the protuberance each have a support surface, and wherein the support surface of the protuberance is lower or higher than the support surface of the groove and wherein the groove and/or protuberance has a slanted surface provided on the same side as the support surface of the groove or protuberance, respectively, at a free end of the groove or protuberance, respectively, such that when the protuberance of the plant base has been taken up in the groove of the corresponding further plant base one of the two plant bases is lifted from a surface at the location of the engaging protuberance and groove and wherein the tail section is provided with supporting feet at the rear and the groove/protuberance combination is provided such that the plant base that is to be lifted locally is lifted at the base section.

2. The plant base according to claim 1, wherein, the seat comprises a circular structure having a diameter and wherein the plant base, when viewed in the longitudinal direction, the length of the tail section is greater than the diameter of the seat.

3. The plant base according to claim 2, wherein, viewed in the longitudinal direction, the length of the tail section is at least twice as large as the diameter of the seat.

4. The plant base according to claim 2, wherein, viewed in the longitudinal direction, the length of the tail section is at least three times as large as the diameter of the seat.

5. The plant base according to claim 1, wherein, viewed in the direction transverse to the longitudinal direction, the width of the rear end of the tail section is at least 50% of the width of the base section.

6. The plant base according to claim 1, wherein, viewed in the direction transverse to the longitudinal direction, the width of the rear end of the tail section is at least 70% of the width of the base section.

7. The plant base according to claim 1, wherein the plant base is provided with an information carrier selected from the group consisting of a magnetic strip or a barcode strip or chip.

8. The plant base according to claim 7, wherein the information carrier can be read remotely.

9. The combination of a conveyor belt and a plant base according to claim 1.

10. The combination of a conveyor belt and a plant base, comprising a plant base having a base section with a seat for a plant pot, wherein the seat comprises a raised rim or a recess in the base section, the raised rim or recess adapted for accommodating the plant pot and wherein the plant base furthermore includes a tail section that extends in the horizontal direction from a rear of the base section, and wherein a groove/protuberance combination also extends substantially in a horizontal direction and is provided respectively at the front of the base section and the rear of the tail section, wherein the protuberance on the plant base is able to be accommodated in the groove of a further corresponding plant base, wherein the groove and the protuberance each have a support surface, and wherein the support surface of the protuberance is lower or higher than the support surface of the groove and wherein the groove and/or protuberance has a slanted surface such that when the protuberance of the plant base has been taken up in the groove of the corresponding further plant base one of the two plant bases is lifted from a surface at the location of the engaging protuberance and groove and wherein the conveyor belt has a conveyor belt width, wherein the conveyor belt extends along and over a support surface and, wherein the plant base has supporting feet that, viewed transversely to the tail, have a mutual spacing that is greater than the conveyor belt width.

* * * * *